Jan. 12, 1937. P. S. MORGAN 2,067,457
POWER TRANSMISSION MECHANISM
Filed June 1, 1934  5 Sheets-Sheet 2

Inventor
Porter S. Morgan
By Albert R. Henry
Attorney

Inventor
Porter S. Morgan
Albert R Henry
Attorney

Jan. 12, 1937.  P. S. MORGAN  2,067,457
POWER TRANSMISSION MECHANISM
Filed June 1, 1934   5 Sheets-Sheet 4

Inventor
Porter S. Morgan
By
Albert R. Henry
Attorney

Jan. 12, 1937. P. S. MORGAN 2,067,457
POWER TRANSMISSION MECHANISM
Filed June 1, 1934   5 Sheets-Sheet 5

Inventor
Porter S. Morgan
Albert R. Henry
Attorney

Patented Jan. 12, 1937

2,067,457

UNITED STATES PATENT OFFICE 2,067,457

POWER TRANSMISSION MECHANISM

Porter S. Morgan, New York, N. Y., assignor, by mesne assignments, to The Centripetor Company, Detroit, Mich., a corporation of Michigan Application June 1, 1934, Serial No. 728,558

22 Claims. (Cl. 60—53)

This invention relates to power transmission mechanism, and it has particular reference to mechanism comprising a pair of fluid responsive members respectively connected to and between a driving and a driven shaft for circulation of fluid in a relatively stationary casing, for transmitting power between the shafts.

It has heretofore been proposed to provide a driving connection between a pair of shafts by means of a hydraulic pump having one of its elements connected to one shaft, and a cooperating element connected to the other shaft, to circulate fluid between the outlet and inlet ports of the pump upon the relative rotation of the shafts, and to provide a valve in the fluid circuit, which, upon being closed, locked the pump and thereby enforced the mutual rotation of the shafts and the resultant transmission of power. Devices of this nature, or fluid clutches, are of limited applicability, for while they provide for connecting a driving shaft to a driven shaft, they are obviously incapable of effecting a torque multiplication, or applying the input power to the driven shaft with increased mechanical advantage.

It has also been proposed heretofore to operate a fluid pump through a driving shaft, and to utilize the output of the pump to drive a fluid motor connected to the driven shaft, which motor may be adjusted to have either a greater, equal, or less capacity than the pump, whereby power could be transmitted from one shaft to the other with varying speed and torque ratios. The transmission ratio in such devices is essentially a matter of arbitrary selection by the operator, and, as the mechanism is complicated, and presents many disadvantages when compared to well designed gear transmissions, the latter type has been generally preferred in the arts. In these gear transmissions, as it is well known, any one of say three or four speed ratios may be selected, either manually or more or less automatically, by the use of a clutch and gear shifting apparatus.

The endeavor to effect the automatic selection of the gear ratio may be said to be predicated, in part at least, by recognition of the desideratum of a power transmission in which the speed ratio between the driving and driven shafts would be selected by the transmission itself from an infinite number of possible ratios, to provide the most effective ratio between the power input and the load demand. This goal may also be considered as inspired by the natural principle that the product of a force into a lever arm (termed "torque"), and the speed, is a definition of power, and the criterion of an efficient machine is: that the input and output are made as nearly equal as possible. If, therefore, the relative speeds of the driving and driven shafts adapted themselves inversely as the ratio of the torque input and torque demand or load, a condition would be established for a true, and fully automatic, or "torque responsive" power transmission. For the reasons alluded to above, the prior art devices are obviously incapable of satisfying this criterion.

According to the present invention, it is proposed to provide a power transmission in which, subject only to the limitations imposed by the inherent characteristics and specific properties of the apparatus, the desired relation between input, output, and relative speeds may be effectively and practically attained. To this end, the invention contemplates a power transmission in which fluid responsive members, such as pumps, turbines, motors, or the like, are so coupled to and between the driving and driven shafts as to circulate fluid from one to the other, in a predetermined or in opposing directions, or to tend to circulate fluid in opposing directions, the extent or character of such circulation being in general responsive to the relation between the power input and the load demand. In another aspect, the invention proposes a fluid responsive member, which may be a pump, or motor, or partake of the characteristics of both, connected to and driven by the driving shaft, in combination with a second fluid responsive member having cooperating elements connected to both the driving and driven shafts, both of which members are normally driven by the driving shaft to force, or to tend to force, fluid in opposing directions through a relatively fixed or stationary casing. In this aspect of the invention, it is further contemplated that the stronger or more powerful of such members, and hence the actual direction of flow through the fluid circuit, will be determined within the characteristics of the apparatus by the relation of the power input and the load demand. Furthermore, the invention contemplates that in such system, the relative speed of the driving and driven shafts will depend upon the direction and extent of flow of fluid in the circuit, or, in general, will be automatically responsive to or dependent upon the relation between the input and the load.

Viewed in another light, the invention provides fluid responsive members, one or both of which may act either as a fluid pump, or a fluid motor, or both, depending upon the direction of flow of fluid transmitted by or operating on the members. When using such instrumentalities it is possible to achieve a certain amount of regeneration of, or saving in power applied to the system, thereby permitting the transmission to safeguard the prime mover from excessive loads, utilize the power to the greatest advantage, and, withal, make the relative speeds of the driving and driven shafts a function of or proportionate to the power input and the load demand.

In a more specific aspect, the invention contemplates the employment, as one of the fluid responsive members, of a centrifugal pump or turbine, or a device selectively partaking of the characteristics of both, to the end that the force developed by fluid passing through it shall be directly related to the speed of the driving shaft. When using such means, any load, within the capacity of the apparatus, may be overcome simply by increasing the speed of the prime mover. In another more specific aspect, the invention contemplates the use, as one of the fluid responsive devices, of a highly efficient positive displacement pump, which is interconnected between the driving and driven shafts.

In conjunction with the various foregoing several or collective principles, the invention further proposes the transmission of the fluid through a casing or conduit which is preferably relatively fixed with respect to the fluid responsive members, and in which, advantageously, there are disposed resistances or fluid directing devices, serving, particularly when the load is great in proportion to the speed of the engine, to increase the load demand on the engine. It will further be shown how such means may be provided to augment the naturally opposing tendencies of the fluid responsive members when the ratio of speed between the driving and driven shafts is great, but to have a diminishing effect in calling forth additional power when the load is reduced.

The invention further provides for a number of novel structural arrangements of parts, including the provision of a member which may act as a fluid turbine or centrifugal pump while running in the same direction,—the character being determined by the conditions existing in the fluid circuit, and hence in the relation between power input and load demand. The nature of such features will be more apparent, however, from the following description of one embodiment by means of which all the foregoing principles may be practiced in the manner now best known to me.

In presenting such embodiment, there has been selected for purposes of explanation a power transmission particularly suitable for use in an automobile, so designed as to overcome heavy loads at relatively low speeds. It should be understood, however, that such explanation is not made by way of limitation of my invention to less than is severally or conjointly referred to hereinabove, or as defined both broadly and specifically in the several appended claims. In general, I regard my invention as consisting of a number of improvements in power transmissions, which may be utilized individually or conjointly, the principles of all of which, however, will be hereinafter described.

Figure 1:
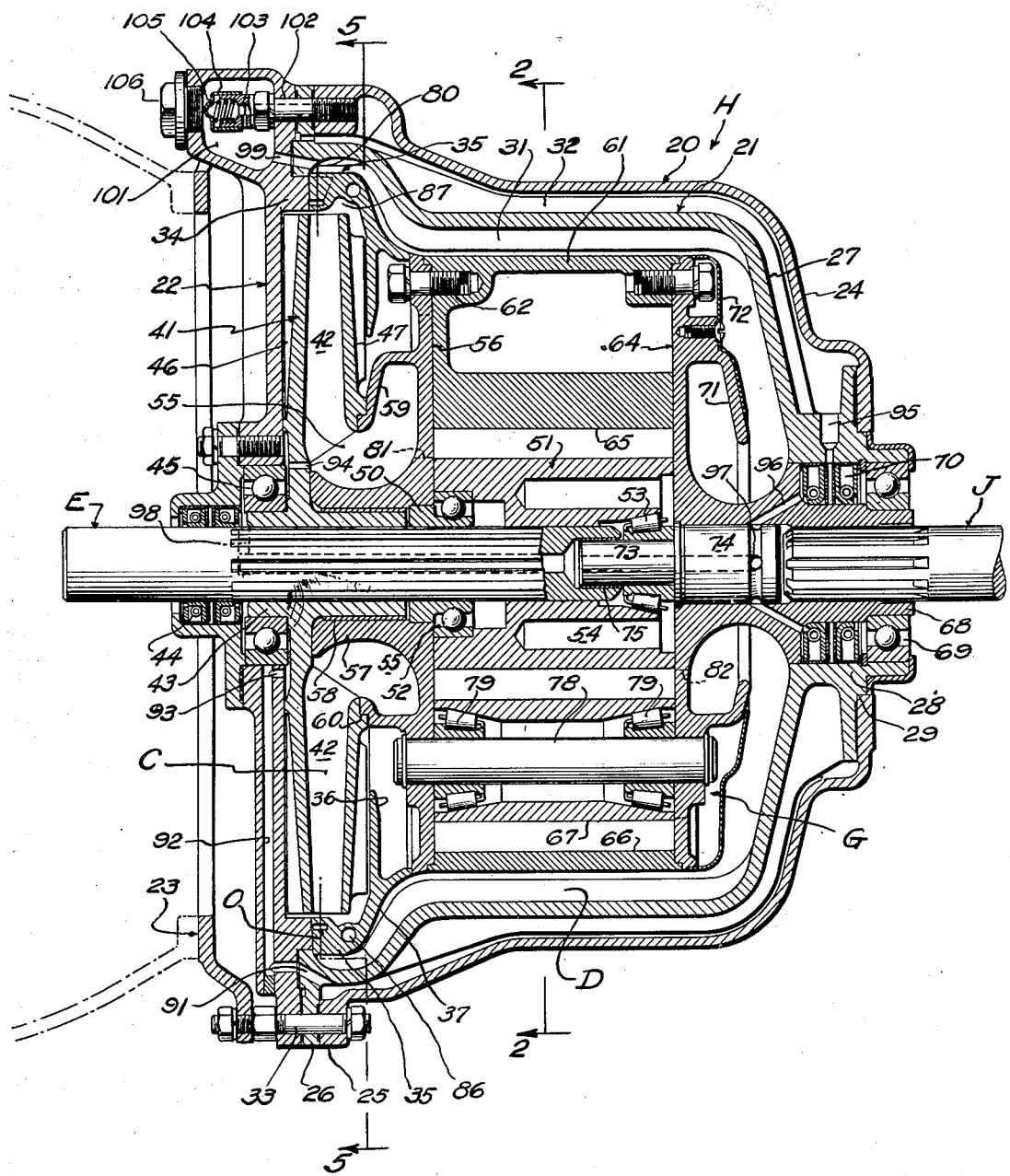
Fig. 1 is a longitudinal section through the power transmission mechanism.

The power transmission shown in Fig. 1 comprises generally a casing or housing H enclosing the mechanism, and into which extend a driving or engine shaft E and a driven or jack shaft J. Mounted on and revolving in unison with the engine shaft E are the impeller of a centrifugal pump C, and one element or gear of a displacement pump G, while the cooperating parts of the pump G are affixed to the driven shaft J. One port of the displacement or gear pump communicates with the inlet or eye of the centrifugal impeller C, while the other port communicates with the periphery of the impeller C through a fixed fluid passage or duct D, in which may be interposed a number of nozzles or orifices O. From this brief description of certain parts of the mechanism, it will be at once apparent that, as the engine shaft is rotated, the centrifugal pump C tends to impart energy to fluid inducing it to flow from left to right through the duct D, while, at the same time, the rotation of the inner gear or element of the pump G, under the influence of the driven shaft, tends to discharge fluid into the duct D in a direction opposed to the flow from the impeller C. The effort or torque imparted to the cooperating element of the gear pump G is also applied to the driven shaft J, thereby providing a means for transmitting power.

Still regarding the parts designated above in a general manner, it will be understood that, whenever the force of the fluid emerging from the gear pump is sufficient to overcome the force created at the periphery of the impeller, the flow through the ducts D will be from right to left, and the turning effort transmitted to the driven shaft J will be measured by the pressure against which the gear pump must act. If such effort, as transmitted, is enough to cause the jack shaft to rotate, then the speed of the gear pump, considered by itself, will be proportionately reduced, and a power transmission will be provided, in which the speed ratio between the engine shaft and the jack shaft may be any value greater than one. If the turning effort so applied is enough to cause the jack shaft to revolve at the same speed as the engine shaft, then the elements of the gear pump will be stationary with respect to each other, and the velocity of the fluid flowing from right to left in the ducts D will be reduced to substantially zero, or a condition of rest. When there is a positive flow of the circulated fluid, however, it is apparent that its force is expended in flowing inwardly through the impeller, and the impeller, in such case, may become a motor to which power is applied for driving purposes from the gear pump. Under such conditions, some of the energy delivered by the engine shaft E to the gear pump G is regenerated, and hence, the energy input of the engine is proportionately decreased.

This effect may be augmented by inserting suitably designed nozzles O in the fluid circuit, which, while increasing the back pressure on the pump G, also provide for return of power to the engine shaft, thereby decreasing the load on the engine itself.

Again, if the power delivered by the impeller is greater than the power delivered by the gear pump, the direction of flow of the transmission fluid will be reversed, and the flow will be from left to right through the ducts D. But, as it has already been assumed that the inner and outer elements of the gear pump, respectively connected to the shafts E and J, are rotating at the same speed and in the same direction, it is apparent that the energy in such flow will be expended in endeavoring to increase the speed of the gears which are connected to the jack shaft, and thus cause the jack shaft to revolve faster than the engine shaft. This is a condition for "overdriving".

From the foregoing general review, it will now be apparent that there is provided a pair of fluid-actuated members, such as the elements C and G, either of which may act as a pump, or as a motor, or which may act as resistances for each other, and which, by virtue of the relative roles which they play, cause a stream of fluid to flow in either of opposed directions, or to remain at rest. It will further be apparent that the performance of the elements C or G, and the resultant effect on the fluid, is dependent (aside from their inherent design or characteristics) upon two factors only, namely,—the input of the prime mover, and the resistance offered to the movement of the driven shaft. That is to say, by the present invention, through the use of a "reversible" fluid circuit operating on interchangeable pumps and motors, there is provided a transmission in which the gear ratio, and hence the speed of the driven shaft, is essentially dependent upon the resistance offered to motion and the force applied to overcome such resistance. Such arrangement of parts permits of the automatic selection of such ratio as is best suited to utilize the power delivered by the engine.

As shown in Fig. 1, the housing H comprises an outer shell 20, an inner shell 21, and a closure plate 22, all of which are fixed in position, and which may be secured to the frame of an automobile or other foundation, indicated schematically by the reference numeral 23. The outer shell 20 is of generally cylindrical contour, being formed at one end with an inwardly extending radial wall or flange 24, and being defined, at its opposite and open end, by a radial flange 25, to which the other stationary elements may be secured. The inner shell 21 is formed at its open end with a radial flange 26 abutting the flange 25, and which merges within the outer shell into a generally cylindrical body, spaced from the outer shell, and thence into a radial wall 27 which terminates in a hub portion 28, so formed as to provide for the joining of the walls 24 and 27, as indicated by the numeral 29. The inner shell 21 is formed along the cylindrical and end wall portions with internal and external ribs 31 and 32, which serve to transfer heat from the mechanism to the surface of the outer shell, where it may be dissipated. The space between the shells 20 and 21 is utilized as a low pressure reservoir or storage compartment for fluid employed in the transmission, in a manner which will be hereinafter more fully described.

Figure 5:
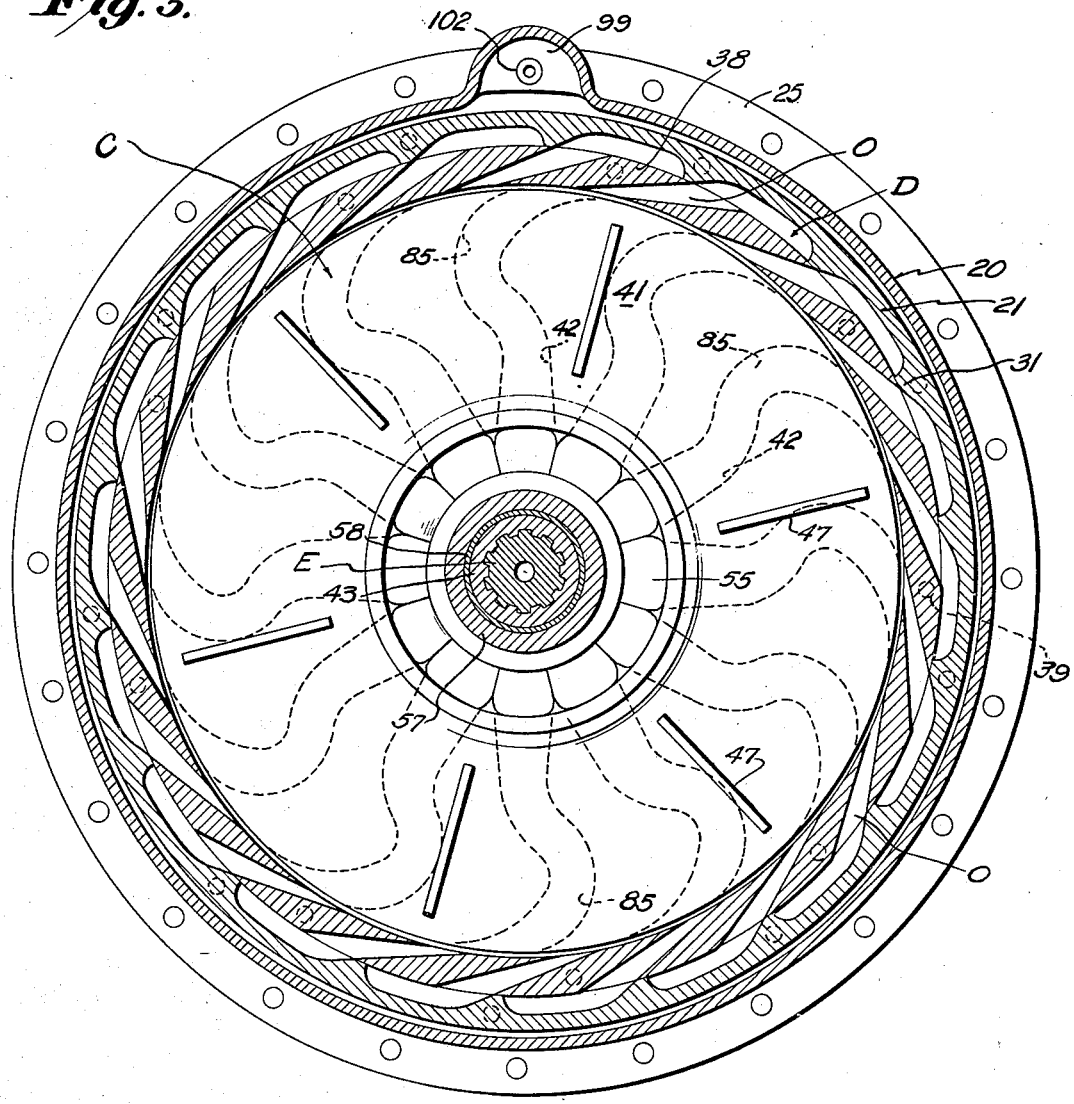
Fig. 5 is a section taken substantially along the line 5—5 of Fig. 1, showing the arrangement of the passages in the centrifugal pump and the relation of the nozzles thereto.
Figure 6:
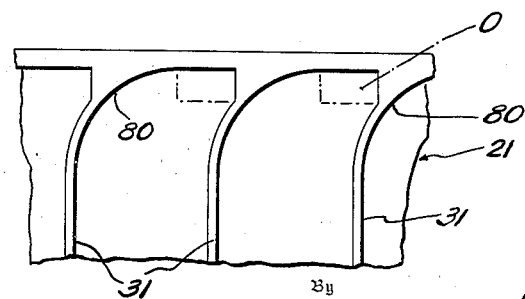
Fig. 6 is a fragmentary plan view showing the ribs on the interior of the casing.

The closure plate 22, which is bolted along its marginal portion to the flange 26 of the inner shell, as shown by the numeral 33, is formed with an axially extending circular flange 34. The plate 22 cooperates with a ring member 35 to provide a housing for the centrifugal pump. The ring member 35 has a peripheral portion formed with a number of openings or nozzles O, and also is formed with an inwardly extending radial flange 36 and an axial flange 37, which is secured to the inner face of the plate 22 in such fashion that the orifices O are made contiguous with the flange 34, and the flange 36 is parallel to but spaced from the inner surface of the wall 22. The axial flange 37 follows generally the contour of the inner shell 21 and its ribs 31. The mode of securing the ring member 35 to the plate 22 is best shown in Fig. 5, from which it will appear that the flange 37 of the member is formed with portions 38 between the nozzles O to receive bolts 39 which enter the wall 22.

The chamber defined by the wall 22 and the contiguous flanges 34 and 36 constitutes a casing for a centrifugal impeller 41, consisting of a circular member formed with a plurality of hollow arms or vanes 42, and a central hub 43. The hub of the impeller is splined to the driving shaft E, which enters the housing H through a packing gland 44, secured to the wall 22. Rotation between the impeller 41 and the fixed housing H is provided for by means of a ball bearing 45, the race rings of which are respectively secured to the wall 22 and the hub 43. It will thus be seen that, as the driving shaft E is rotated by the prime mover, the impeller rotates therewith, to expel or to tend to expel fluid into the ducts D of the casing 21. When so considered, it will be understood that the impeller operates as a fluid pump to circulate liquid from left to right as viewed in Fig. 1. And, to anticipate the description of other parts of the apparatus, and the mode of operation, it may be here pointed out that if fluid were injected through the nozzles O (Fig. 5), the fluid responsive member C could be driven as a fluid motor or turbine, thereby aiding in the turning of the shaft E.

The outer faces of the impeller 41 are formed with ribs or vanes 46 and 47 which lie close to the surfaces of the wall 22 and the flange 36. These members exert centrifugal force on the liquid in the spaces between the fixed walls and thus provide a fluid lock to prevent short circuiting of the liquid during operation of the impeller.

The driving shaft E extends within the housing H, beyond the impeller 41, to receive one element of the fluid responsive member G, which is herein illustrated as a sun or parent gear 51 for a gear pump. The gear 51 is splined to the shaft E and it is recessed at its ends to receive bearings 52 and 53. The gear 51 is also drilled, as indicated by the numeral 54, to reduce its weight. The bearing 52 has one of its race rings mounted in the left hand recess of the gear 51, while the cooperating race ring is formed with a hub portion 50, which is rotatably mounted in the face plate 56 of the gear pump housing, which is hereinafter more fully described. The hub 57 of the plate 56 is rotatably mounted on the hub 43 of the impeller 41 by means of a bushing 58. The hub 57 extends axially to rotatably engage the wall of the impeller 41, and the radial portion of the plate 56 extends outwardly to align with the curve of the fixed ring member 35. The plate 56 is also formed with a laterally extending portion 59 which, together with the right hand portion of the impeller 41, is formed with a labyrinth seal 60 which closes the central portion of the impeller, to define its inlet port or eye 55.

The gear pump housing includes a cylindrical body 61, to the left hand face of which the plate member 56 is secured by bolts 62, while its right hand face is capped by a plate 64 which is also secured thereto. The body contains an axial bore 65 which closely encompasses the parent gear 51 (Fig. 2) and three radially spaced smaller bores 66 which subtend the arc of the central bore. The bores 66 are formed each to receive a planetary pinion 67 which meshes with the parent gear 51. The faces of the gear and pinions all slidably contact the faces of the opposed face plates 56 and 64, which complete the enclosure thereof.

The plate 64 is formed with a long hub 68, which extends into the hub 28 of the shell 21, and a bearing 69 is interposed therebetween, with which is associated a packing gland 70, to prevent leakage of liquid from the transmission. The hub 68 is internally splined to receive the driven shaft J, and it will thus be seen that one element of the fluid responsive member G is connected directly to the driven shaft J, while the remaining element, the gear 51, is connected to the driving shaft E.

The right hand port plate 64 is also formed with an inwardly extending radial flange 71 to direct fluid, emerging from or flowing into the ports, toward the center of the apparatus, and this flange is finished off by an annular cover 72 which conceals the holding bolts and provides a smooth passage between the pump casing and the wall of the shell 21, to define the duct D, which extends, as it will now be seen, from one port of the pump G to the nozzles O. It will also be understood that the eye 55 of the impeller is in fluid communication with the ports in the left hand port plate 56.

The parent gear 51 and the housing of the pump G are further supported for rotation by means of a stud 74, which is mounted in an axial bore of the hub 68. The stud 74 is provided with a reduced portion 73 which is piloted within a bushing 75 mounted within the recessed end of the shaft E. The roller bearing 53, previously referred to, has one of its races secured to or formed in the gear 51, while the cooperating race is secured to the reduced portion 73 of the stud 74. It will thus be seen that the various bearings permit the members C and G to be rotated at the same or differential speeds, and that the member G may be rotated as a unit, or its respective parts may be rotated with respect to each other.

Figure 4:
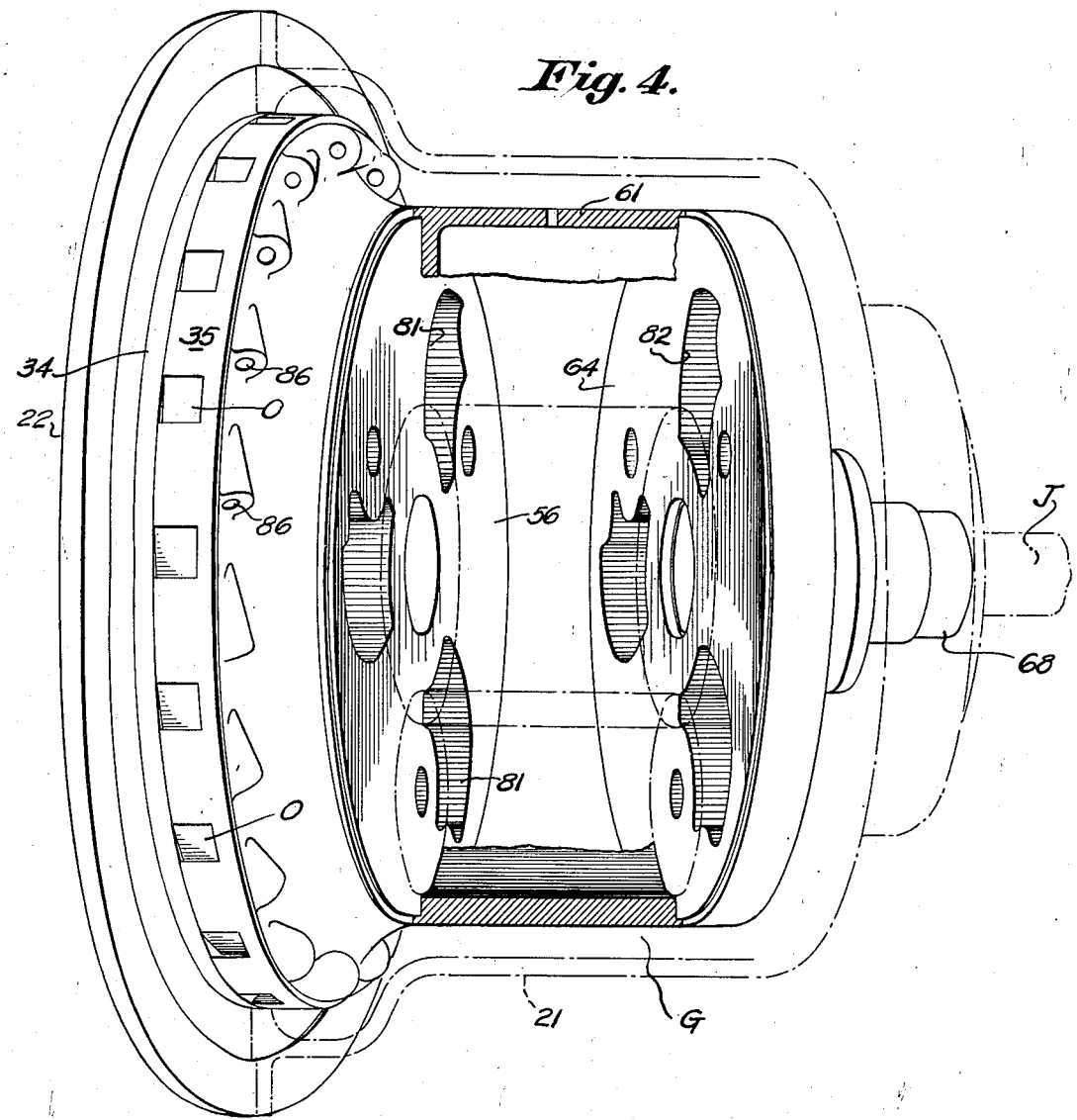
Fig. 4 is a perspective of parts of the mechanism, showing particularly the ports for the gear pump and the relation of the pump casing to the centrifugal pump.

Each pinion 67 is mounted on an axle 78, which is fixed between the port plates 56 and 64, through the medium of a pair of roller bearings 79. The arrangement of the ports in the respective plates is best shown in Figs. 2 and 4, from which it will be seen that the left hand ports 81 and the right hand ports 82 are equal in number, there being a port on each side of each pinion 67, but the ports are disposed on opposite sides of the intersection points of the gear and pinions.

Figure 2:
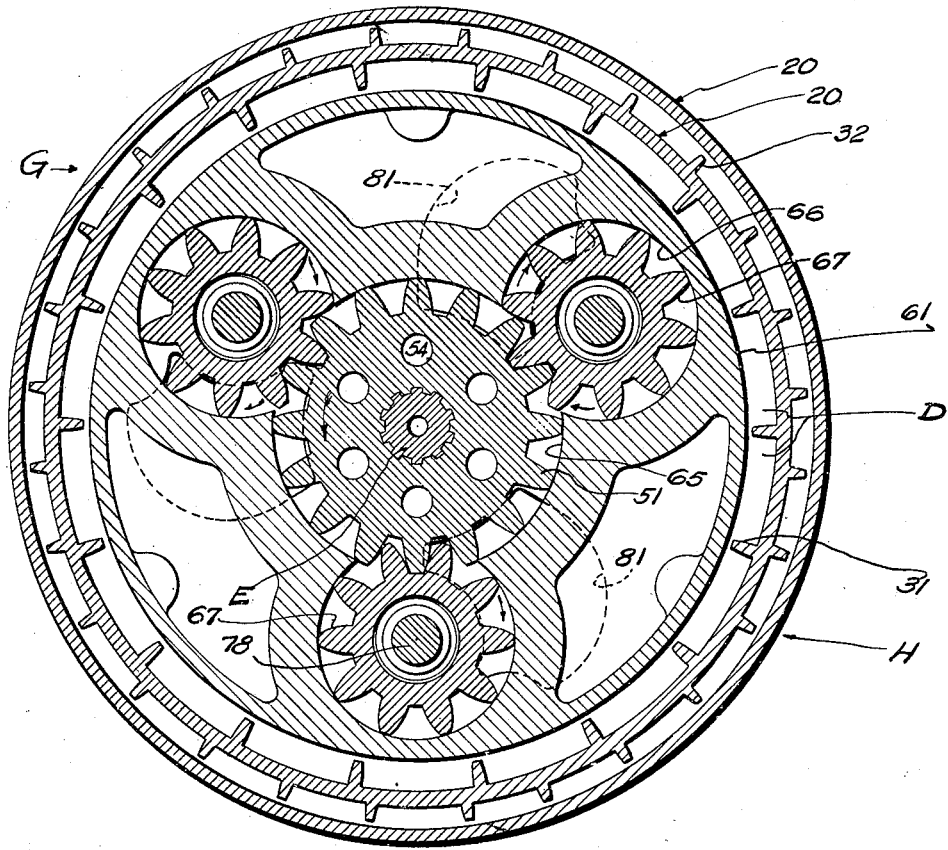
Fig. 2 is a section taken substantially along the line 2—2 of Fig. 1, and showing the gear pump construction.

That is to say, if the parent gear 51, as viewed in Fig. 2, be considered as rotating counterclockwise, with the casing 61 fixed, the pinions 67 would rotate clockwise, and fluid would be swept in, through the left hand port 81, around the bore 66 in which the pinion is mounted, and so on to the opposite port 82, which lies on the opposite side of the point of intersection. Or, if fluid were admitted through the port 82, it would also be swept around through the bore 66 in which the pinion is mounted, and so on out of the port 81, which is located at the point of approaching engagement of the gears.

Figure 3:
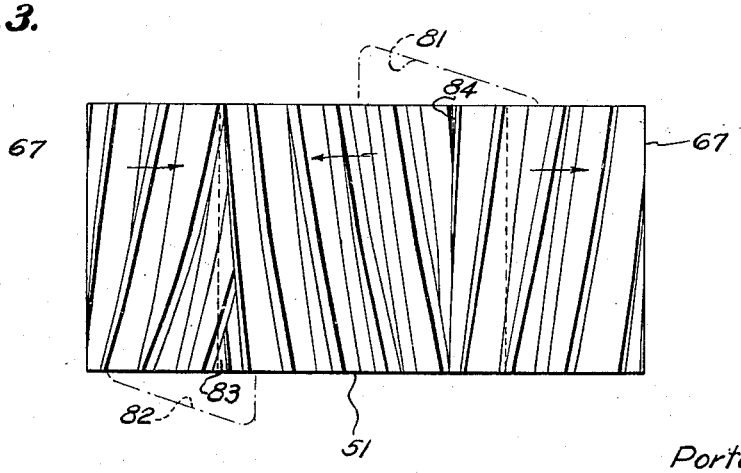
Fig. 3 is a plan of the gears in the gear pump.

Referring now to Fig. 3, it will be observed that the gear 51 and pinions 67 are of helical form. In this type of gearing, the pumping action or motor action may be visualized by considering the gear 51 to be rotating in a counter-clockwise direction, as indicated by the arrow. The left hand pinion 67 will therefore tend to rotate in a clockwise direction, and the spaced teeth at the point marked by the numeral 83 will tend to close, to eject liquid through the adjacent port 82. At the same time, there will be a point under, and to the rear of the point 83, where the teeth will be receding from each other, such as the point 84 of the right hand pinion. A suction will therefore be created, and liquid will be supplied through the aligned port 81, to fill the void, and to be carried around by the gear teeth until such teeth reach a point corresponding to the point marked 83, where the discharging action will be repeated. Or, if the pump be regarded as driven by the fluid, then the admission port would be the point 83, and the fluid pressing against the gear teeth would tend to rotate them. In practice, it is preferred to form the teeth as spirals of small angularity, to minimize thrust, and, by providing a number of pinions 67, the volumetric capacity is increased, the operation of the unit is made very smooth and uniform, the torque distributed, and the hydraulic losses are diminished.

From the foregoing description, it will be appreciated that the various parts above described provide for the circulation of fluid in either direction through the duct D. That is to say, without regarding the various operating conditions which may be encountered, or the limits imposed by the dimensions and details of design, it is apparent that the fluid responsive member C may act as a force pump, in which case the fluid responsive member G may act as an opposing pump, or be driven by the force of the liquid discharged from the member C. Or, the converse situation may obtain, when the member G operates as a pump, to force energy-containing fluid into the member C, which is then converted into a hydraulic motor. In short, the foregoing arrangement of parts includes a pair of fluid responsive members which may function either as fluid pumps or fluid motors, and which are disposed in a continuous fluid circuit having a stationary portion exterior to both of the members.

Figure 7:
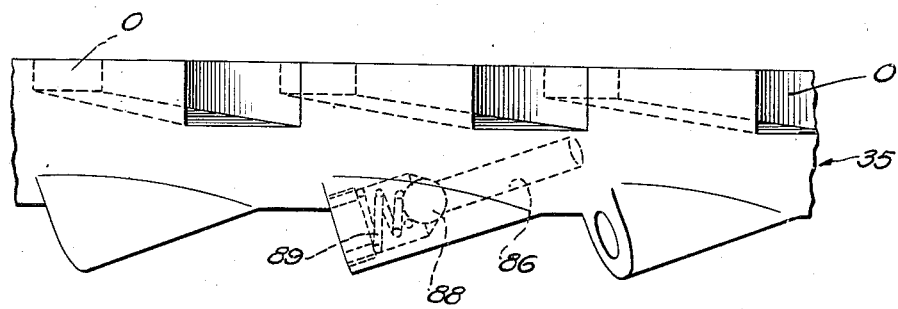
Fig. 7 is an enlarged fragmentary plan view of the nozzle ring.
Figure 8:
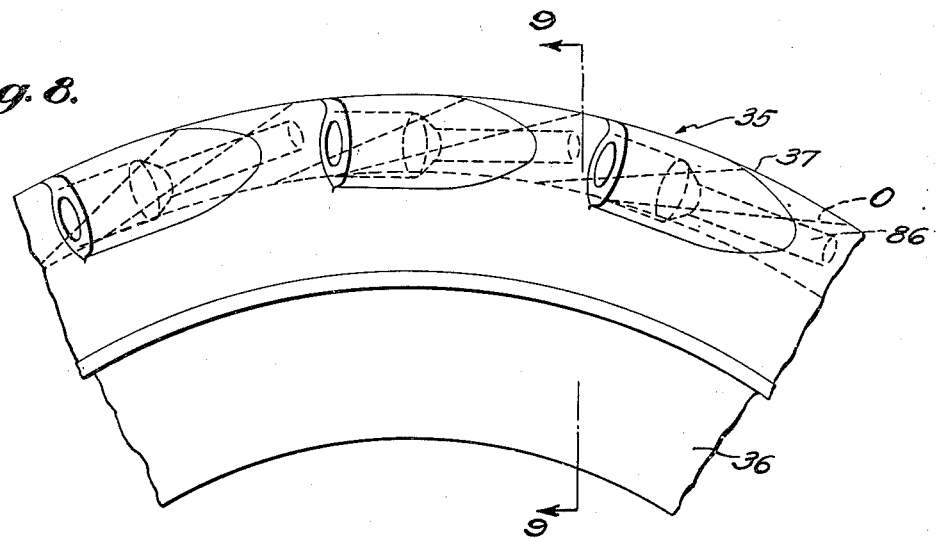
Fig. 8 is a side elevation of Fig. 7.
Figure 9:
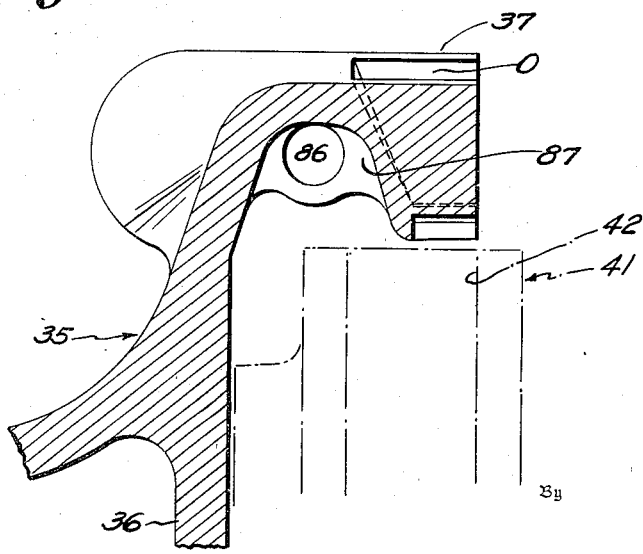
Fig. 9 is an enlarged section on the line 9—9 of Fig. 8.

In Figs. 7 to 9, the particular structure of the ring 35, which cooperates to permit the above mentioned liquid flow reversal, is more clearly shown. It will be noted that the ribs 31 of the inner shell 21 are each curved (Fig. 6) at their left hand extremity 80 so that the flow of the fluid therein is changed from an axial to a radial and tangential direction, such direction being counterclockwise (Fig. 5) to accord with the direction of rotation of the impeller 41. The terminals of the various ducts D, as thus defined by the ribs 31, each deliver liquid to a nozzle O, which in turn is devised to impinge liquid at a high velocity tangentially to the periphery of the impeller (Figs. 5, 6, 7 and 9).

The impeller 41 is preferably formed with arms 42, which are particularly devised to absorb substantially all of the kinetic energy of the liquid received from the nozzles. For this reason the extremity of each arm 42 is curved as indicated by the numeral 85, and such curved portions approximately form a continuation of the nozzles O.

The curved extremities are roughly semi-circular, and they are proportioned with due consideration to the relative velocities of the emergent liquid and the peripheral speed of the impeller, whereby the arms of the impeller each receive a portion of the fluid stream and allow this portion to expend its energy on the curved portion 85 of this arm before entering the radial portions thereof.

When the speed of the jack shaft J approaches that of the driving shaft E, then a condition is approached where the velocity of the liquid through the nozzles O becomes negligible. It will be appreciated that when the impeller is caused to accelerate under these conditions, the force of the displacement pump will be entirely overcome and the liquid will be directed from the impeller through the ducts D to the pump G. To permit the fluid to emerge from the ring 35 without the heat losses which would be experienced if the nozzles O were utilized for this purpose, a plurality of outlet ports 86 are formed in the ring 35 which are directed in an opposite direction to that of the nozzles O, so that liquid may pass therethrough in a manner to permit a large part of the kinetic energy to be converted into pressure head in the ducts D. It will be noted that the ports 86 (Figs. 7 to 9) extend at a slight angle through the ring 35 and terminate in a vortex chamber 87 formed in the ring 35 adjacent the nozzles O. Liquid discharged through these passages avoids the curved extremities of the ribs 31 and it is therefore directed into the ducts D somewhat in the manner of a diffusion ring of a turbine pump.

In order that the function of the nozzles O be unimpaired during the first of the described conditions, each passage 86 is provided with a ball check valve 88 backed by a light spring 89 so that, when the pressure in the ducts D is greater than the pressure in the impeller chamber, the passages 86 will be effectually closed; while, when the impeller begins to function as a pump, the valves 88 will be free to open against the urge of the springs 89.

In the operation of these instrumentalities, with a suitable transmission fluid, such as oil, within the inner casing 21, it will be apparent that due to temperature changes, churning, and the like, the volume of the fluid may change. To adjust for such changes in volume, the outer shell 20 is utilized as a reservoir in fluid communication with the inner casing, so that the fluid may move between the casings as conditions require. The outer casing is connected to the eye of the impeller 41 through a port 91 formed in the flange 26 of the inner casing, which communicates with a radial passage 92 formed in the outer wall 22. This passage, in turn, communicates with a port 93 which discharges into a slightly recessed portion of the impeller hub 43, which is in communication with another port 94 leading into the eye of the impeller. A second fluid connection is provided through the passage 95, disposed in the hub 28 of the housing H, to communicate with the packing gland 70 and a lateral passage 96, and it finally communicates with a radially disposed passage 97 formed in the stud 74. Both the stud 74 and the shaft E are formed with an axial passage, through which liquid may flow, to be discharged into the eye of the impeller through a radial hole 98 formed in the shaft E, and thence through the port 94, as before.

It will be seen that both of these supply or relief circuits between the inner and outer casings communicate with the suction point of the fluid circuit, and thus excessive fluid pressures are relieved from the packings at the ends of the housing. The flange 26 and the wall 22 are also formed with aligned openings 99, at the upper part of the apparatus, to connect the duct D with an overflow chamber 101, formed on the outer surface of the plate 22. A valve body 102 is disposed between the chamber 101 and the outer casing 20, and it is formed with a small radial capillary passage 103, through which air may pass to be returned to the outer casing. The body 102 is covered at its end with a sleeve 104, which is normally pressed outwardly by means of a spring 105 to expose the passage 103. When, however, a large quantity of liquid under pressure is injected into the chamber 101, it cannot be passed through the small hole 103, and hence it exerts its force against the end of the sleeve 104 to overcome the spring 105, and thus close, or almost close the hole 103. The fluid under pressure accordingly is retained in the inner casing.

The chamber 101 is provided with a filling plug 106 through which operating liquid may be supplied to the system. In practice, enough liquid is used to fill the inner casing, and a part of the outer casing. As more liquid is required in the inner casing, it is supplied from the outer casing, any air entrapped therewith being recirculated and discharged through the valve body 102. When there is an excess of liquid in the inner casing, it is returned to the outer casing by flowing in a reverse direction through the circuits previously described. Since there is substantially no pressure in the outer casing, such flow does not tend to cause leakage around the packings 44 and 70.

Figure 10:
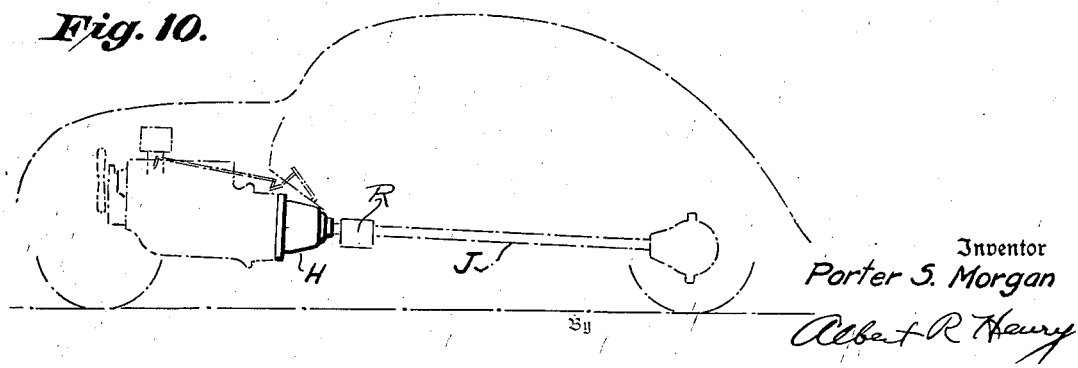
Fig. 10 is a diagrammatic view, showing the transmission installed in an automobile.

In considering in summary the operation of the transmission, reference may be made to the application shown in Fig. 10, in which an automobile engine is coupled to the driving shaft J through the herein described transmission H, a reversing gear R of any desired type being provided for reversing the direction of the vehicle. In this illustrative case, the condition at starting is that the engine is rotating at a relatively low speed, and a heavy load is imposed on the driven shaft through the rear axles and wheels of the car. Such slow engine speed, it may be assumed, develops a relatively limited centrifugal force in the impeller C, and the gear pump, which is driven at the same speed, pumps fluid against the impeller, through the nozzles O, and into the arms 85.

If it now be assumed that the engine speed is increased, then it follows that the resistance developed in the member C is also increased, according to the laws of hydraulics, as the square of the speed. At the same time, the horsepower input to the pump G is increased, not only because of the increase in speed, but due to the greater head against which the gear pump must operate. The torque reaction in the gear pump is of course communicated to the driven shaft J, and, as soon as the transmitted torque is great enough to overcome the starting load, the vehicle will move.

At the same time, the fluid emerging from the gear pump G passes through the ducts D, and the nozzles O, against the vanes 85. This fluid possesses energy, which is returned to the impeller C in the curved or "Pelton wheel cup" portions of the vanes. The engine load or output is therefore diminished, to the extent that energy is regained in the centrifugal. However, since the input to the gear pump is the sum of the engine and centrifugal inputs (considering now that the centrifugal is operating as a fluid motor or turbine), the result is that the torque on the jack shaft is greater than the engine torque. In short, there is a torque multiplication.

Under the condition just discussed, namely, a stationary jack shaft, it is apparent that the head against which the gear pump must work is composed of two factors. First, there is the resistance in the centrifugal itself, which varies with the speed of the engine, and hence the speed of the gear pump; and second, there is the resistance offered by the restriction of the ducts D in the nozzles O. This last factor varies with the velocity of flow in the ducts, or it varies with the speed of the gear pump. However, as the jack shaft begins to move, the gear pump speed decreases, and hence this second factor diminishes, and finally disappears when there is no fluid flow through the nozzles.

The condition of comparative rest in the fluid circuit is that the engine shaft and the driven shaft shall rotate at the same speed. Whenever this condition obtains, the force developed by the centrifugal just balances the force developed through the gear pump, which is now measured by the road resistance. Irrespective of the actual speed of the engine, such condition will occur when the engine input in torque is equal to the resistance in torque. At such time, the gear pump does not operate to pump fluid, nor does the centrifugal.

Considering the next condition of operation, namely, that of overdriving, it will be apparent that such condition will exist when the power input required to operate the engine shaft and attached centrifugal is in excess of the power resistance imposed on the driven shaft. That is to say, after a condition of rest in the gear pump, or a condition of direct drive has been reached, the road resistance may suddenly diminish, and the centrifugal will then operate as a force pump, discharging fluid through the ports 86, to operate the pump G as a motor. To the extent that such operation takes place, the driven shaft J will revolve faster than the engine shaft E. As soon, however, as the engine speed is reduced, or the road resistance is increased, some one of the previously discussed conditions will be established.

In designing a transmission for an automobile it is preferable to provide for a great torque increase at low jack shaft speeds, so that any normal resistance may be overcome. In other types of installations, however, it may be deemed preferable to make further provision for overdriving, or for limiting the range of available speed ratios. It will therefore be understood that it is not intended to limit the invention to structures embracing all of the elements, advantages, or features hereinabove discussed, or to preclude numerous modifications of the various parts which have been illustrated, or to restrict the invention to some special use or application. Those skilled in the art will appreciate that many such variations may be resorted to, within the scope of the invention, as hereinafter defined.

I claim:

1. A power transmission comprising a driving shaft and a driven shaft, a fluid responsive member connected to the driving shaft, a second fluid responsive member having cooperating parts respectively connected to the driving and driven shafts, a housing for said members, said housing being formed with a relatively fixed fluid passage connecting said members, each of said members being operative to force fluid in opposing directions through said passage when the driving shaft is rotated at a higher speed than the driven shaft, a resistance disposed in said passage, said resistance having a progressively diminishing effect as the speeds of the driving and driven shafts approach the same value.

2. A power transmission comprising a driving shaft, a driven shaft, a centrifugal impeller connected to the driving shaft, said impeller having a rim and an eye, a fluid responsive member having cooperating elements respectively connected to the driving shaft and the driven shaft, said member being formed with ports, a casing enclosing said members and relatively stationary with respect thereto, and a fluid passage formed in the casing for conducting fluid between the ports of said member and the eye and rim of said impeller in a cyclic path.

3. A power transmission comprising a driving shaft, a driven shaft, a centrifugal impeller connected to the driving shaft, said impeller having a rim and an eye, a gear pump having one of its elements connected to the driving shaft and a cooperating element connected to the driven shaft, ports for the gear pump, and a casing including a fluid passage around said impeller and pump, said passage connecting one of the ports of the gear pump with the rim of the impeller, and a fluid passage between the eye of the impeller and the other of said ports.

4. A power transmission comprising a driving shaft, a driven shaft, a centrifugal impeller connected to the driving shaft, said impeller having a rim and an eye, a displacement pump having cooperating elements respectively connected to the driving and driven shafts, ports for said pump, and a relatively fixed fluid conduit connecting the rim of the impeller and one of the ports of the pump, said conduit being formed with an orifice of restricted diameter, and a fluid connection between the eye and the other port of the pump.

5. In a fluid power transmission, a casing, aligned driving and driven shafts extending into the casing, a centrifugal impeller secured to the driving shaft and having an input eye, a displacement pump having its elements connected to the driving and driven shafts respectively, a housing for the pump having an input port communicating with the impeller eye and an output port discharging into the casing, and ducts in the casing for connecting the periphery of the impeller with the discharge port of the pump.

6. A power transmission comprising a driving shaft, a driven shaft, a centrifugal impeller connected to the driving shaft, said impeller having a rim and an eye, a fluid responsive member provided with ports and having a part connected to the driving shaft and a relatively movable part connected to the driven shaft, said member being adapted through its resistance to rotation to transmit power to the driven shaft, a casing for the impeller and member, said casing being formed with a fluid duct therein relatively fixed with respect to the impeller, said duct having a restricted portion, said duct connecting the rim of the impeller and one of said ports, whereby the resistance against said member is increased in proportion to the ratio of the speed of the driving shaft and the driven shaft, and fluid connections for the eye of said impeller and the other of said ports to permit the flow of fluid through said impeller and fluid responsive member.

7. A power transmission comprising a driving shaft, a driven shaft, a fluid responsive member including cooperating elements respectively connected to the driving and driven shafts, a fixed casing for said member formed with a fluid passage, said member being adapted, when the driving shaft is rotated with respect to and in advance of the driven shaft, to pump fluid into said passage, means responsive to the speed of the driving shaft for opposing the pumping action, and means responsive to the ratio of the speed of the driving shaft to the speed of the driven shaft for augmenting said opposing action.

8. A power transmission comprising a casing having a fluid passage, a driving and a driven shaft mounted in said casing for relative rotary movement, a fluid pump having one of its elements connected to the driving shaft and a cooperating element connected to the driven shaft, the discharge port of said pump being in fluid communication with said passage, means responsive to the speed of the driving shaft for opposing the flow of fluid into said passage, and other means responsive to the ratio of the speed of the driving shaft to the speed of the driven shaft for augmenting the opposing action of the first named means.

9. A power transmission comprising a casing having an end wall formed with an axial opening, a shaft extending into said opening, a centrifugal impeller mounted on the shaft, said casing being provided with a wall portion lying adjacent the impeller, a fluid duct formed in the casing exteriorly of said impeller and wall portion, a plurality of nozzles formed in said duct and in said wall portion adjacent the periphery of the impeller, vanes formed on said impeller to prevent liquid from flowing between said walls and impeller when the driving shaft is rotated, a driven shaft extending into the casing and means in fluid communication with the duct for imposing a rotative effort on the driven shaft when the driving shaft is operated.

10. A power transmission comprising a casing adapted to receive a pair of axially spaced shafts, a driving shaft extending into the casing, a parent gear mounted on the driving shaft, a pinion carrier mounted concentrically with the parent gear, said carrier being formed with a plurality of apertures each adapted to receive a pinion gear, pinion gears disposed in said apertures meshing with the parent gear, a port plate formed with ports secured to one end of the carrier, said plate being provided with a hub portion rotatably mounted in the casing, a driven shaft secured to the hub, a second port plate formed with ports secured to the opposite end of the carrier, said second plate being rotatably mounted on the driving shaft, means for mounting the pinions on said port plates for rotation in said carrier, a fluid responsive member mounted in said casing for rotation with the driving shaft, and a fluid duct in said casing to conduct liquid through said port plates and said fluid responsive member.

11. In a fluid transmission, a casing, coaxial driving and driven shafts extending into said casing, a parent gear mounted on the driving shaft, a plurality of planetary gears meshing with the parent gear, said gears being of the helical type, a housing secured to the driven shaft and comprising a cylindrical portion formed with an axial bore closely encompassing the parent gear and a plurality of radially spaced bores encompassing said planetary gears, said last bores subtending the arc of the first bore, plates secured to the opposite faces of the cylindrical portion and enclosing the gears, axles extending between the plates and each rotatably receiving a planetary gear, ports formed in the faces of the plates adjacent the gears, an impeller mounted on the driving shaft and formed with an eye, and a rim means connecting said eye to the ports of one plate for fluid communication, and means connecting the rim of the impeller with the ports of the other plate for fluid communication.

12. A fluid transmission comprising a casing adapted to receive a pair of axially aligned shafts, a driving shaft extending into said casing, a driven shaft extending into the casing through the opposite end thereof, a gear pump disposed between said shafts, said gear pump including a parent gear mounted on the driving shaft and a pinion carrier connected to the driven shaft, said pinion carrier being formed with a plurality of apertures, pinions mounted in said apertures meshing with the parent gear, port plates formed at either end of the carrier, ports formed in each of said port plates, said ports being disposed at the zone of approaching contact of the parent gears and pinion in one of said plates and at the zone of receding contact in the other of said plates, whereby said gear pump may operate either as a pump or motor while the driving and driven shafts rotate in the same direction, flanges formed on said port plates for directing fluid from said ports to the axis of the shafts, a fluid passage exterior of the pump in communication with the ports thereof, whereby fluid may be circulated through the pump in a cyclic path, and means actuated by the driving shaft for opposing the action of the gear pump as a pump.

13. In a fluid transmission comprising a casing, coaxial driving and driven shafts extending into the casing, a centrifugal impeller mounted on the driving shaft and formed with an eye and a rim, a gear pump having a parent gear secured to the driving shaft and planetary pinions meshing therewith, a carrier for the pinions secured to the driven shaft, means on the carrier each rotatably receiving a pinion, said carrier formed to provide a housing for the gear and pinions and having inlet ports disposed adjacent said eye and communicating therewith and outlet ports communicating with the casing, and means in the casing for connecting the outlet ports of the pump and the rim of the impeller.

14. In a fluid transmission, a casing, coaxial driving and driven shafts extending into the casing, a centrifugal impeller secured to the driving shaft and formed with an eye and a rim, a displacement pump having one element secured to the driving shaft and a second element secured to the driven shaft, a housing for the pump secured to the driven shaft and being formed with inlet ports communicating with the eye of the impeller and outlet ports discharging into the casing, means in the casing for connecting the outlet ports with the rim of the impeller, said casing being formed with axial ribs closely encompassing the pump housing to retard the rotation of liquid therein with the rotation of the pump housing.

15. In a fluid power transmission, a driving shaft, a driven shaft, a fluid responsive member having cooperating elements respectively connected to the driving and driven shafts, whereby said fluid responsive member may pump fluid when the driving shaft revolves faster than the driven shaft, a casing for said fluid responsive member, said casing being formed with a duct for conducting fluid pumped by said fluid responsive member, a centrifugal impeller connected to the driving shaft and disposed in said casing, said impeller being formed with vanes for discharging liquid when said driving shaft is rotated, said impeller being in fluid communication with said duct at the periphery thereof, a fluid passage connecting the eye of the impeller with the inlet port of the fluid responsive means, whereby fluid may be circulated in said casing in a closed path, and nozzles disposed in said duct to direct fluid expelled by said fluid responsive means against the open ends of said vanes, whereby the free energy of the fluid expelled by the pump is expended in aiding the rotation of the impeller and overcoming the centrifugal force created thereby.

16. In a fluid power transmission, a driving shaft, a driven shaft, a casing into which said shafts extend, a fluid pump disposed in the casing, said pump having cooperating elements respectively connected to the driving and driven shafts, a fluid duct in the casing for conducting fluid expelled by the pump, a centrifugal impeller mounted on the driving shaft, said impeller, during rotation with the driving shaft, tending to expel fluid into said duct in a direction opposed to the flow from the pump, and nozzles interposed in said duct between the periphery of the impeller and said pump for directing fluid expelled by the pump against the periphery of the impeller, whereby energy in fluid expelled by the pump is recovered in the impeller.

17. A fluid power transmission comprising a driving shaft, a driven shaft, a fluid responsive member connected to the driving shaft, said fluid responsive member being formed with vanes for expelling fluid contained therein under the influence of centrifugal force created by the rotation of said member, said member being formed with means for receiving a stream of fluid whereby said member may be operated as a turbine against the resistance of the centrifugal force, a fluid pump having cooperating elements respectively connected to the driving and driven shafts, whereby relative rotation of said shafts causes said pump to expel fluid and to impose a torque on the driven shaft, a casing formed with a fluid passage adapted to receive fluid so expelled and conduct it to said fluid responsive member, and means in said passage for directing said fluid to said fluid receiving means.

18. A fluid power transmission comprising a driving shaft, a driven shaft, means operative by the rotation of the driving shaft with respect to the driven shaft to pump fluid, a casing adapted to receive fluid so pumped, a centrifugal impeller connected to the driving shaft, said impeller being formed with vanes adapted to discharge fluid under centrifugal force or to receive fluid opposing said force, and nozzle means in said casing for directing fluid expelled by the pump against said impeller vanes, said nozzles being formed with restricted orifices, whereby relative rotation of the driving and driven shafts produces a regeneration of energy on the driving shaft and induces the driven shaft to rotate with the driving shaft.

19. In a fluid transmission, a driving shaft, an impeller connected thereto, said impeller being formed with a central eye and a plurality of outwardly extending vanes, said vanes terminating in curved portions extending through an arc of more than ninety degrees, a casing for the impeller, said casing being formed with a plurality of nozzles directed toward the curved portions of said vanes, whereby a moving stream of fluid impinging the ends of said vanes will give up its kinetic energy to said rotor against the centrifugal force created by the rotation thereof, a driven shaft, fluid responsive means interposed between the driving and driven shafts for creating a moving stream of fluid when the driving shaft revolves faster than the driven shaft, means for conducting said moving stream to said nozzles for discharge therethrough and into said vanes, and means for conducting fluid driven through said vanes away from said eye.

20. In a fluid transmission, a driving shaft, an impeller secured thereto and formed with a plurality of arms, a casing for the impeller formed with a plurality of nozzles directed toward the periphery of the impeller in the direction of the rotation thereof, said casing being also formed with discharge passages for the impeller, a driven shaft, fluid responsive means interposed between the driving and driven shafts for directing a stream of liquid to the impeller nozzles for impingement upon the impeller arms, said passages being provided with check valves to prevent entry therethrough when said means is directing fluid to the nozzles, said valves being releasable when the impeller develops sufficient pressure to overcome said fluid responsive means.

21. A power transmission comprising a driving shaft, a driven shaft, a centrifugal impeller including a rim and an eye connected to the driving shaft, a displacement pump having cooperating elements respectively connected to the driving shaft and the driven shaft, ports for the pump, a fixed casing enclosing said impeller and pump, said casing including a fluid conduit connecting said rim and eye respectively of said impeller to the ports of the pump in a cyclic path.

22. A fluid power transmission comprising a driving shaft and a driven shaft, a casing into which the shafts extend, pumping means operative by the relative rotation of the shafts for creating a fluid force, a centrifugal impeller having a rim and an eye connected to the driving shaft, said rim and eye being connected by vanes, whereby, upon rotation of the driving shaft a fluid centrifugal force will be created tending to discharge through said rim, a fluid circuit between said pumping means and the rim of the impeller, and nozzle means in said casing and in the fluid circuit for directing the free energy of fluid expelled by the pumping means against the rim of the impeller to impose a turbine action thereon in opposition to the centrifugal force developed therein, and a fluid passage from the eye to the intake of said pumping means.

PORTER S. MORGAN.